United States Patent
Lei et al.

(10) Patent No.: US 11,743,004 B2
(45) Date of Patent: Aug. 29, 2023

(54) EXTENDED DEMODULATION REFERENCE SIGNAL SCRAMBLING IDENTIFIER FOR DEMODULATION REFERENCE SIGNAL COMMUNICATION

(71) Applicant: QUALCOMM Incorporated, San Diego, CA (US)

(72) Inventors: Jing Lei, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/949,716

(22) Filed: Nov. 11, 2020

(65) Prior Publication Data

US 2021/0152304 A1 May 20, 2021

Related U.S. Application Data

(60) Provisional application No. 62/936,243, filed on Nov. 15, 2019.

(51) Int. Cl.
| | |
|---|---|
| *H04L 5/00* | (2006.01) |
| *H04L 27/26* | (2006.01) |
| *H04W 74/08* | (2009.01) |

(52) U.S. Cl.
CPC ........ *H04L 5/0048* (2013.01); *H04L 27/2605* (2013.01); *H04W 74/0833* (2013.01)

(58) Field of Classification Search
CPC ... H04L 5/0048; H04L 27/2605; H04L 5/001; H04L 5/005; H04L 25/0224; H04L 25/03866; H04L 5/0053; H04L 27/2675; H04L 5/0051; H04L 5/0016; H04L 27/2607; H04L 27/2613; H04W 74/0833; H04B 7/0684

See application file for complete search history.

(56) References Cited

U.S. PATENT DOCUMENTS

| | | | |
|---|---|---|---|
| 11,303,410 B2* | 4/2022 | Ren | H04L 1/0072 |
| 2013/0021991 A1* | 1/2013 | Ko | H04L 5/0007 370/329 |
| 2013/0235819 A1* | 9/2013 | Zhang | H04L 5/005 370/329 |

(Continued)

OTHER PUBLICATIONS

International Search Report and Written Opinion—PCT/US2020/070775—ISA/EPO—dated Feb. 9, 2021.

(Continued)

*Primary Examiner* — Ajit Patel
*Assistant Examiner* — Wilfred Thomas
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station (BS), information identifying a quantity of demodulation reference signal (DMRS) sequences supported per antenna panel of the BS. The UE may transmit a DMRS communication having one or more DMRS sequences configured based at least in part on the quantity of DMRS sequences supported per antenna panel and scrambled using an extended DMRS scrambling identifier that is based at least in part on a physical random access channel preamble. Numerous other aspects are provided.

30 Claims, 7 Drawing Sheets

(56) References Cited

U.S. PATENT DOCUMENTS

| | | | | |
|---|---|---|---|---|
| 2015/0029972 | A1* | 1/2015 | Park | H04L 1/1896 |
| | | | | 370/329 |
| 2015/0156753 | A1* | 6/2015 | Shan | H04W 72/0466 |
| | | | | 370/335 |
| 2015/0271814 | A1* | 9/2015 | Park | H04L 5/0048 |
| | | | | 370/329 |
| 2017/0279584 | A1* | 9/2017 | Pajukoski | H04L 1/0038 |
| 2019/0052329 | A1* | 2/2019 | Aiba | H04L 5/0053 |
| 2019/0268949 | A1* | 8/2019 | Menon | H04W 74/0858 |
| 2019/0342062 | A1* | 11/2019 | Ren | H04L 5/026 |
| 2020/0374072 | A1* | 11/2020 | Ren | H04L 1/0072 |
| 2020/0396047 | A1* | 12/2020 | Gao | H04L 5/0051 |
| 2021/0176687 | A1* | 6/2021 | Ko | H04W 36/04 |
| 2021/0321419 | A1* | 10/2021 | Li | H04L 1/1896 |
| 2021/0367655 | A1* | 11/2021 | Jiang | H04L 5/0048 |
| 2021/0385039 | A1* | 12/2021 | Cha | H04J 13/004 |
| 2022/0038319 | A1* | 2/2022 | Kuchi | H04L 27/2613 |
| 2022/0295570 | A1* | 9/2022 | Rosa | H04W 74/0841 |

OTHER PUBLICATIONS

Samsung: "Introduction of Two-Step RACH", 3GPP Draft, R1-1913175, 3GPP TSG-RAN WG1 Meeting #99, 3rd Generation Partnership Project (3GPP), Mobile Competence Centre, 650, Route Des Lucioles, F-06921, Sophia-Antipolis Cedex, France, vol. RAN WG1 No. Reno. USA, Nov. 18, 2019-Nov. 22, 2019, Nov. 12, 2019 (Nov. 12, 2019), XP051824801, 20 Pages, Retrieved from the Internet: URL:https://ftp.3gpp.org/tsg_ran/WG1_RL1/TSGR1_99/Docs/R1-1913175.zip R1-1913175_CR_38.213_2Step_RACH-Core_allmarks. docx [retrieved on Nov. 12, 2019] Sections 8.1A, 8.2A, p. 17-p. 19.

Vino: "Discussion on Channel Structure for 2-Step Rach", 3GPP Draft, 3GPP TSG RAN WG1 #98bis, R1-1910198_Discussion on Channel Structure for 2-Step RACH, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14, 2019-Oct. 20, 2019, Oct. 4, 2019 (Oct. 4, 2019), XP051789003, 15 Pages, Retrieved from the Internet: URL:http://www.3gpp.org/ftp/tsg_ran/WG1_RL1/TSGR1_98b/Docs/R1-1910198.zip [retrieved on Oct. 4, 2019] the Whole Document.

Vivo: "Other Aspects for 2-Step RACH and UE Features", 4GPPDraft, R1-1912006, 3GPP TSG RAN WG1 #99. 3rd Generation Partnership Project(3GPP), Mobile Competence Centre, 650, Route Des Lucioles, F-06921, Sophia-AntiPolis Cedex, France, vol. RAN WG1. No. Reno. Nevada, US, Nov. 18, 2019-Nov. 22, 2019, Nov. 8, 2019 (Nov. 8, 2019), XP051819900, Retrieved from the Internet: URL: https://ftp.3gpp.org/tsg_ran/WG1_RL1/TSGR1_99/Docs/R1-1912006.zip R1-1912006_Discussion on channel structure for2-step RACH.docx [retrieved on Nov. 8, 2019] the Whole Document.

WI Rapporteur (ZTE): "RAN1 Agreements for Rel-16 2-step Rach", 3GPP Draft, R1-1911742, 3GPP TSG RAN WG1 #98bis, 3RD Generation Partnership Project (3GPP), Mobile Competence Centre, 650, Route Des Lucioles, F-06921, Sophia-Antipolis Cedex, France, vol. Ran WG1, No. Chongqing, China, Oct. 14, 2019-Oct. 20, 2019, Oct. 30, 2019 (Oct. 30, 2019), XP051814839, 18 Pages, Retrieved from the Internet: URL:https://ftp.3gpp.org/tsg_ran/WG1_RL1/TSGR1_98b/Docs/R1-1911742.zip R1-1911742 RAN1-Agreements for2-step RACH—by RAN 1#98bis.docx [retrieved on Oct. 30, 2019] p. 7.

* cited by examiner

EXTENDED DEMODULATION REFERENCE SIGNAL SCRAMBLING IDENTIFIER FOR DEMODULATION REFERENCE SIGNAL COMMUNICATION

CROSS-REFERENCE TO RELATED APPLICATION

This patent application claims priority to U.S. Provisional Patent Application No. 62/936,243, filed on Nov. 15, 2019, entitled "EXTENDED DEMODULATION REFERENCE SIGNAL SCRAMBLING IDENTIFIER FOR DEMODULATION REFERENCE SIGNAL COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for extended demodulation reference signal (DMRS) scrambling identifier for DMRS communication in uplink grant free transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving, from a base station (BS), information identifying a quantity of demodulation reference signal (DMRS) sequences supported per antenna panel of the BS; and transmitting a DMRS communication having one or more DMRS sequences configured based at least in part on the quantity of DMRS sequences supported per antenna panel and scrambled using an extended DMRS scrambling identifier that is based at least in part on a physical random access channel preamble.

In some aspects, a UE for wireless communication includes a memory and one or more processors coupled with the memory, the memory and the one or more processors configured to receive, from a BS, information identifying a quantity of DMRS sequences supported per antenna panel of the BS; and transmit a DMRS communication having one or more DMRS sequences configured based at least in part on the quantity of DMRS sequences supported per antenna panel and scrambled using an extended DMRS scrambling identifier that is based at least in part on a physical random access channel preamble.

In some aspects, a non-transitory computer-readable medium storing one or more instructions for wireless communication includes one or more instructions that, when executed by one or more processors of a UE, cause the one or more processors to receive, from a BS, information identifying a quantity of DMRS sequences supported per antenna panel of the BS; and transmit a DMRS communication having one or more DMRS sequences configured based at least in part on the quantity of DMRS sequences supported per antenna panel and scrambled using an extended DMRS scrambling identifier that is based at least in part on a physical random access channel preamble In some aspects, an apparatus for wireless communication includes means for receiving, from a BS, information identifying a quantity of DMRS sequences supported per antenna panel of the BS; and means for transmitting a DMRS communication having one or more DMRS sequences configured based at least in part on the quantity of DMRS sequences supported per antenna panel and scrambled using an extended DMRS scrambling identifier that is based at least in part on a physical random access channel preamble.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
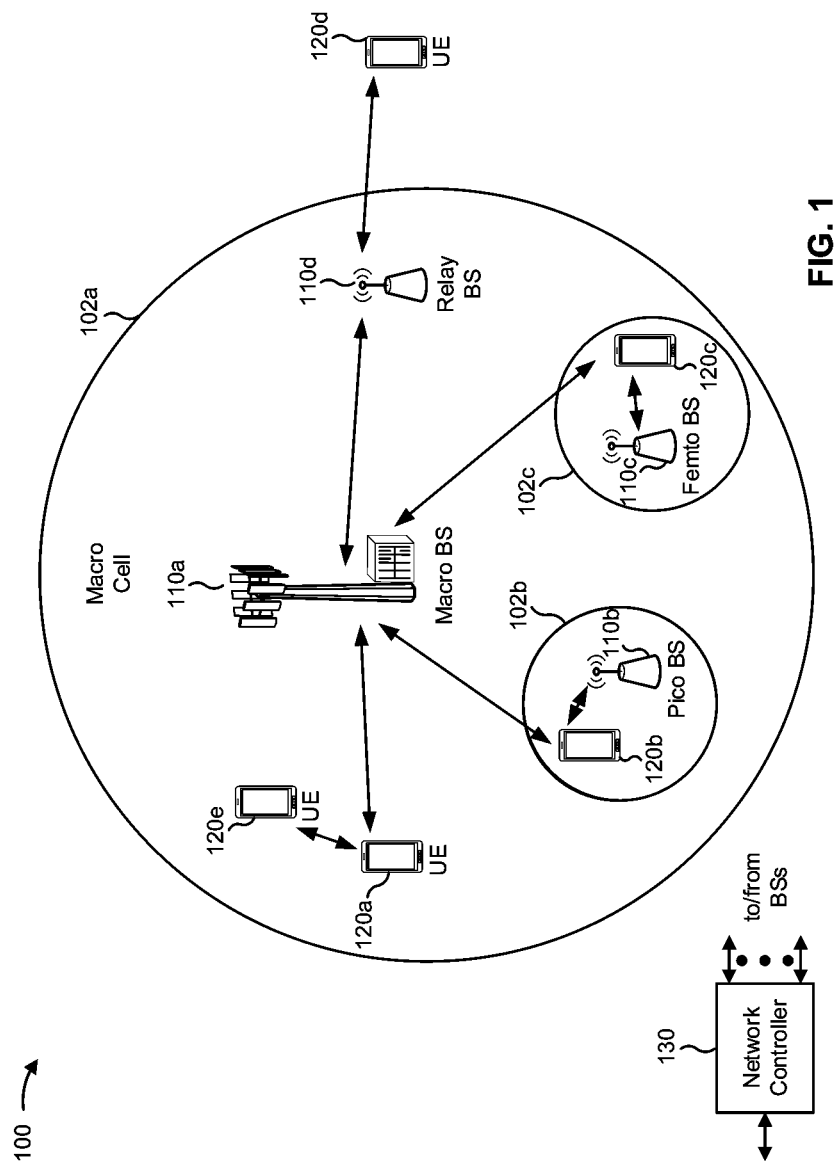
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another (directly or indirectly) via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, vehicle-to-pedestrian (V2P) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
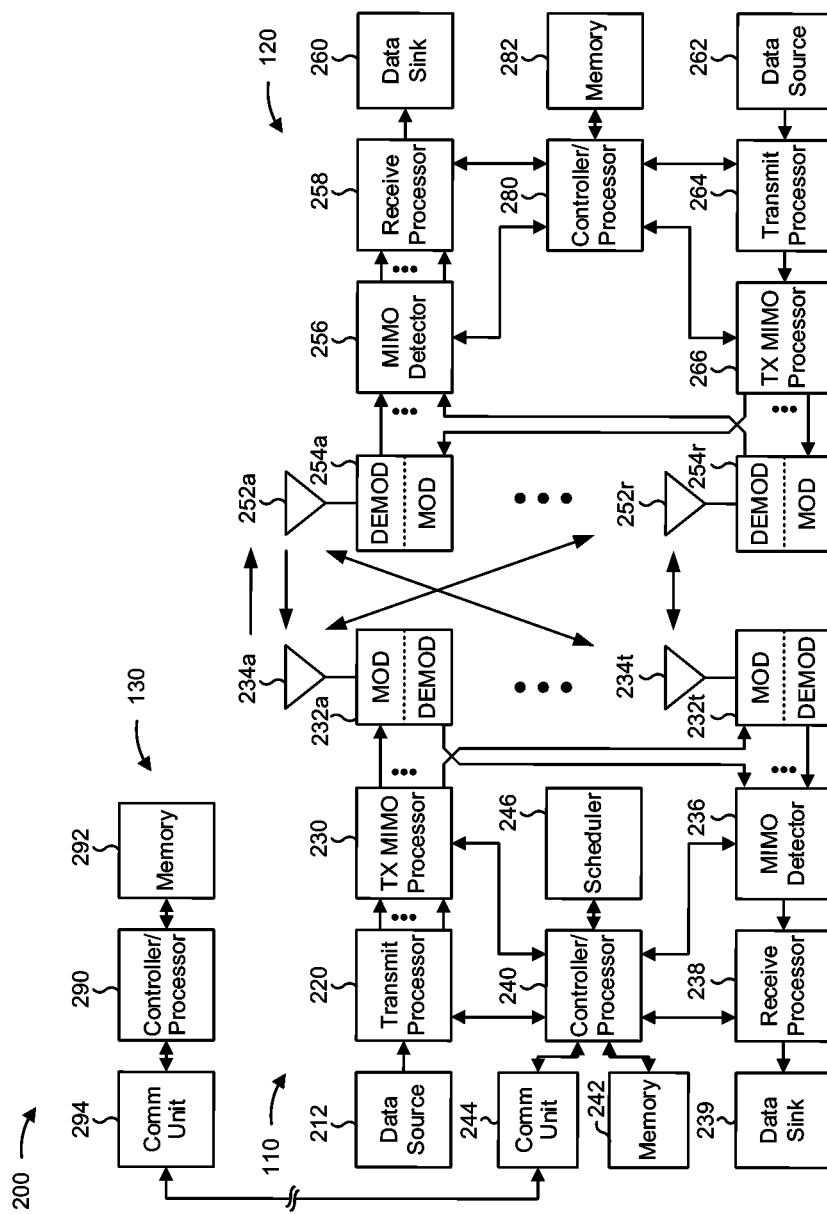
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using an extended demodulation reference signal (DMRS) scrambling identifier for DMRS communication, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for receiving, from a base station (e.g., BS 110), information identifying a quantity of DMRS sequences supported per antenna panel of the BS or means for transmitting a DMRS communication having one or more DMRS sequences configured based at least in part on the quantity of DMRS sequences supported per antenna panel and scrambled using an extended DMRS scrambling identifier that is based at least in part on a physical random access channel preamble, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
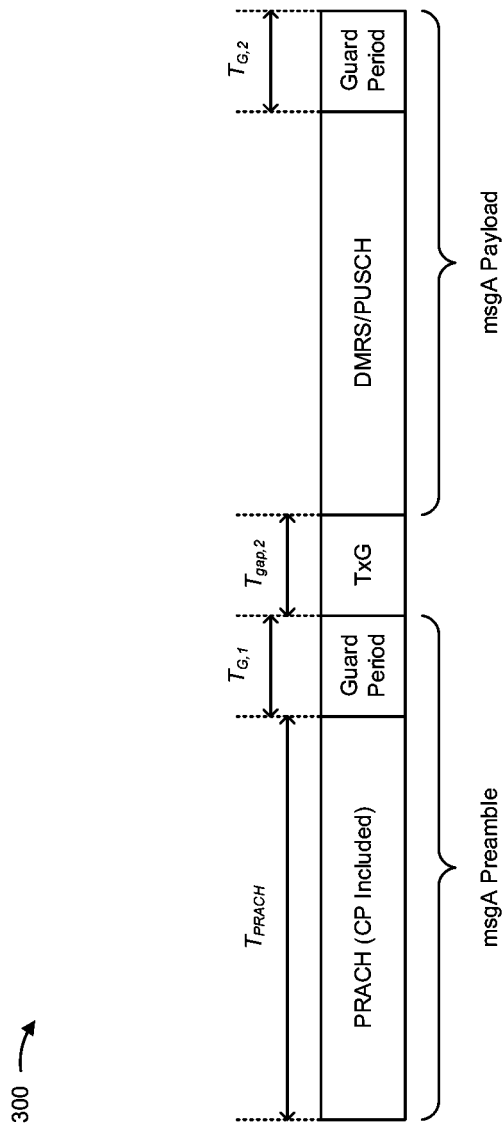
FIG. 3 is a diagram illustrating an example of a channel structure for transmitting a physical random access channel (PRACH) message type A (msgA), in accordance with various aspects of the present disclosure.

FIG. 3 is a diagram illustrating an example 300 of a channel structure for transmitting a physical random access channel (PRACH) message type A (msgA), in accordance with various aspects of the present disclosure.

As shown in FIG. 3, a channel structure for transmitting a PRACH msgA may include resources allocated for a preamble section (msgA Preamble) and a payload section (msgA payload). The preamble section, which may include a cyclic prefix (CP), is in time and frequency resources allocated for PRACH transmission ($T_{PRACH}$). After the time resources allocated for the PRACH transmission, the channel structure may include time and frequency resources allocated as a guard period and/or a gap period ($T_{G,1}$ and $T_{gap,2}$, respectively) to enable transitioning of a transmit chain from msgA preamble transmission to msgA payload transmission. As shown, the msgA payload section may include a DMRS transmission that is multiplexed with a physical uplink shared channel (PUSCH) transmission, as described in more detail herein. The msgA payload section may include a guard period ($T_{G,2}$) to enable a UE to transition from transmitting the PRACH msgA to transmitting another communication or receiving a communication.

As indicated above, FIG. 3 is provided as an example. Other examples may differ from what is described with respect to FIG. 3.

Figure 4:
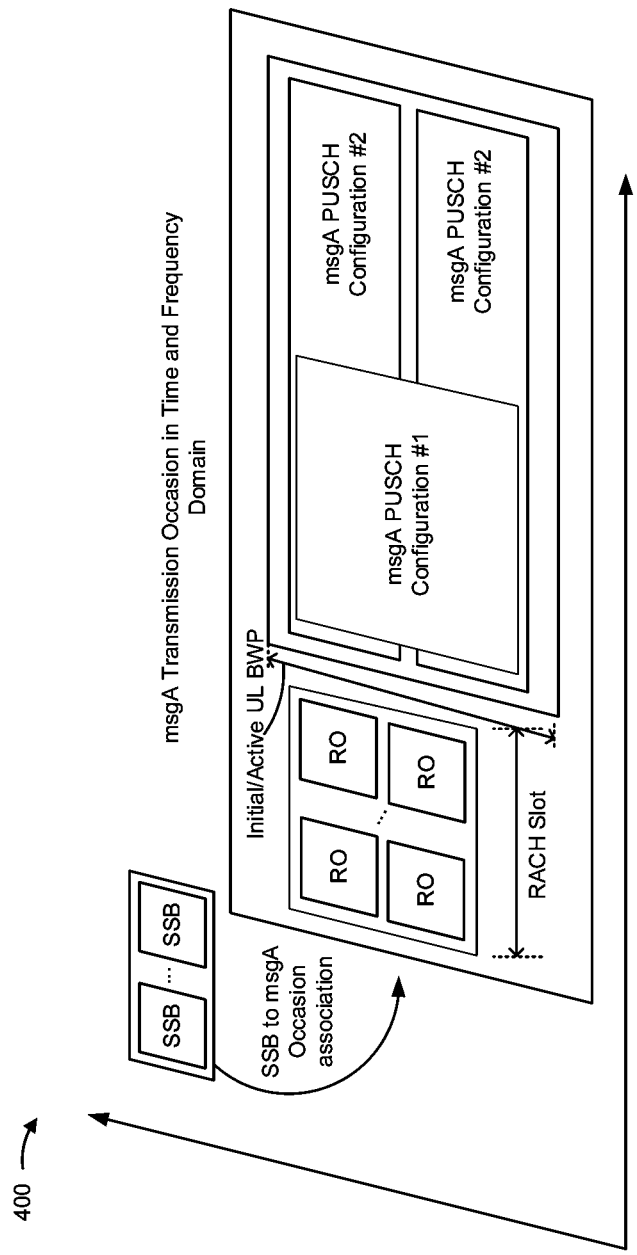
FIG. 4 is a diagram illustrating an example of a resource mapping for transmitting a PRACH msgA, in accordance with various aspects of the present disclosure.

FIG. 4 is a diagram illustrating an example 400 of a resource mapping for transmitting a PRACH msgA, in accordance with various aspects of the present disclosure.

As shown in FIG. 4, a msgA transmission occasion may include time resources and frequency resources that map to a synchronization signal block (SSB) of a set of SSBs. The msgA transmission occasion may occur in an initial or an active uplink bandwidth part (BWP) and may include a random access channel (RACH) slot with a set of RACH occasions (ROs). Further, the msgA transmission occasion may include one or more different types of PUSCH configurations, such as an msgA PUSCH configuration #1 and an msgA PUSCH configuration #2.

In some aspects, a BS may configure, when a UE is in a radio resource control (RRC) idle state or an RRC inactive state, a first set of two different transport block sizes (TBSs) for the msgA PUSCH in a system information. The first set of two different TBSs may be configured for transmission in an initial BWP. In contrast, the BS may configure, when the UE is in an RRC connected state, a second set of two different TBSs for the msgA PUSCH. In this case, the BS may configure the second set of TBSs in RRC signaling for an active bandwidth part (e.g., which may be the same or different from the initial bandwidth part). Based at least in part on receiving information identifying a set of transport block sizes from the BS, the UE may select a particular TBS based at least in part on a layer 1 reference signal received power (RSRP) measurement, a content of a msgA data buffer, a satisfaction of a msgA group size parameter, and/or the like.

As indicated above, FIG. 4 is provided as an example. Other examples may differ from what is described with respect to FIG. 4.

Figure 5:
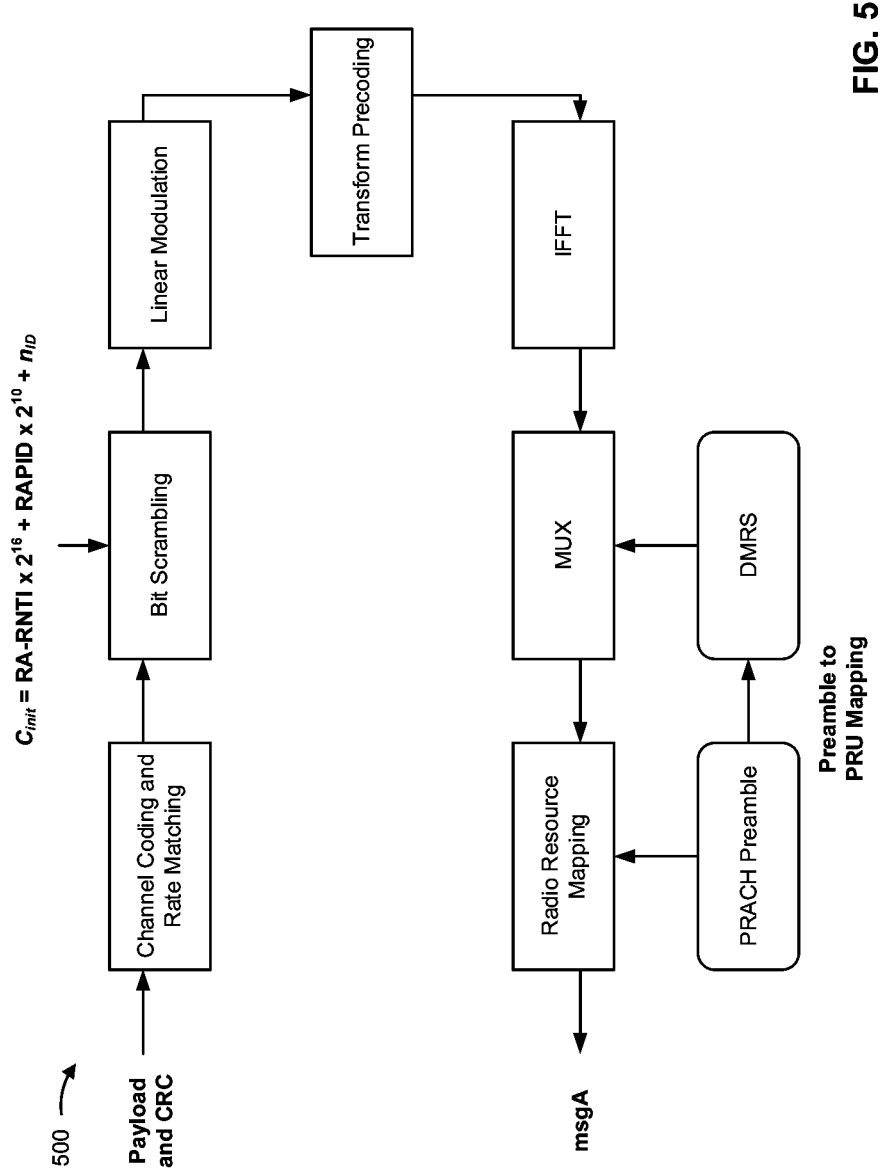
FIG. 5 is a diagram illustrating an example of a transmit chain for transmitting a PRACH msgA, in accordance with various aspects of the present disclosure.

FIG. 5 is a diagram illustrating an example 500 of a transmit chain for transmitting a PRACH msgA, in accordance with various aspects of the present disclosure.

As shown in FIG. 5, a UE, such as UE 120, may include a transmit chain for transmitting msgA. In this case, the UE may receive, at the transmit chain, a payload and cyclic redundancy check (CRC) and may perform channel coding and rate matching on the payload and CRC to generate bits for transmission. After performing channel coding and rate matching, the UE may use a scrambling sequence to scramble bits of the payload and CRC. For example, the bit scrambling module may use a scrambling sequence of the form:

$$C_{int} = RA\text{-}RNTI \times 2^{16} + RAPID \times 2^{10} + n_{ID},$$

where $C_{int}$ represents an initial value of the scrambling sequence, RA-RNTI is a random access (RA) radio network temporary identifier (RNTI), and nip represents an initialization value based at least in part on a UE identifier.

As further shown in FIG. 5, based on scrambling bits, the UE may perform linear modulation and, in some cases, transform precoding, as described in more detail herein. After linear modulation (and transform precoding, in some cases), the UE may perform inverse fast-Fourier-transform (IFFT) processing. After IFFT processing, the UE may multiplex a DMRS with the payload and CRC (e.g., symbols generated based at least in part on bits thereof). After multiplexing the DMRS with the payload and the CRC, the UE may perform radio resource mapping to generate a msgA preamble based at least in part on a PRACH preamble and a msgA payload based at least in part on the payload and CRC and the DMRS.

A UE may generate the DMRS for multiplexing with content of msgA using a DMRS scrambling identifier. The UE may determine the DMRS scrambling identifier based at least in part on a waveform of a corresponding physical uplink shared channel (PUSCH) of the msgA. In contention based random access (CBRA)-based two-step random access channel (RACH) procedures, using a DMRS scrambling identifier based at least in part on a PUSCH waveform (e.g., a discrete Fourier transform spread orthogonal frequency division multiplexing (DFT-s-OFDM) waveform or a cyclic prefix orthogonal frequency division multiplexing (CP-OFDM) waveform) may result in a collision between different DMRSs. This may result in dropped communications, reduced throughput, and/or the like.

Thus, some aspects described herein enable the UE to use an extended DMRS scrambling identifier, for a DMRS, that is determined based at least in part on a scrambling identifier for a msgA PUSCH that is to be multiplexed with the DMRS. For example, the UE may determine the extended DMRS scrambling identifier based at least in part on the PRACH preamble, as shown. In this way, by reusing the PRACH preamble for determining the extended DMRS scrambling identifier, the UE reduces a likelihood of collision with increasing a processing and/or memory utilization associated with using other types of dedicated DMRS scrambling identifier for various waveforms.

In some aspects, the UE may determine the extended DMRS scrambling identifier based at least in part on the quantity of DMRS sequences that are supported per antenna panel of the BS. In some aspects, the UE may map the PRACH preamble to a PUSCH resource unit (PRU) to determine the extended DMRS scrambling identifier and perform a DMRS generation procedure. In this way, the UE may generate an extended DMRS scrambling identifier that reduces a likelihood of collision during CBRA-based two-step RACH.

As indicated above, FIG. 5 is provided as an example. Other examples may differ from what is described with respect to FIG. 5.

Figure 6:
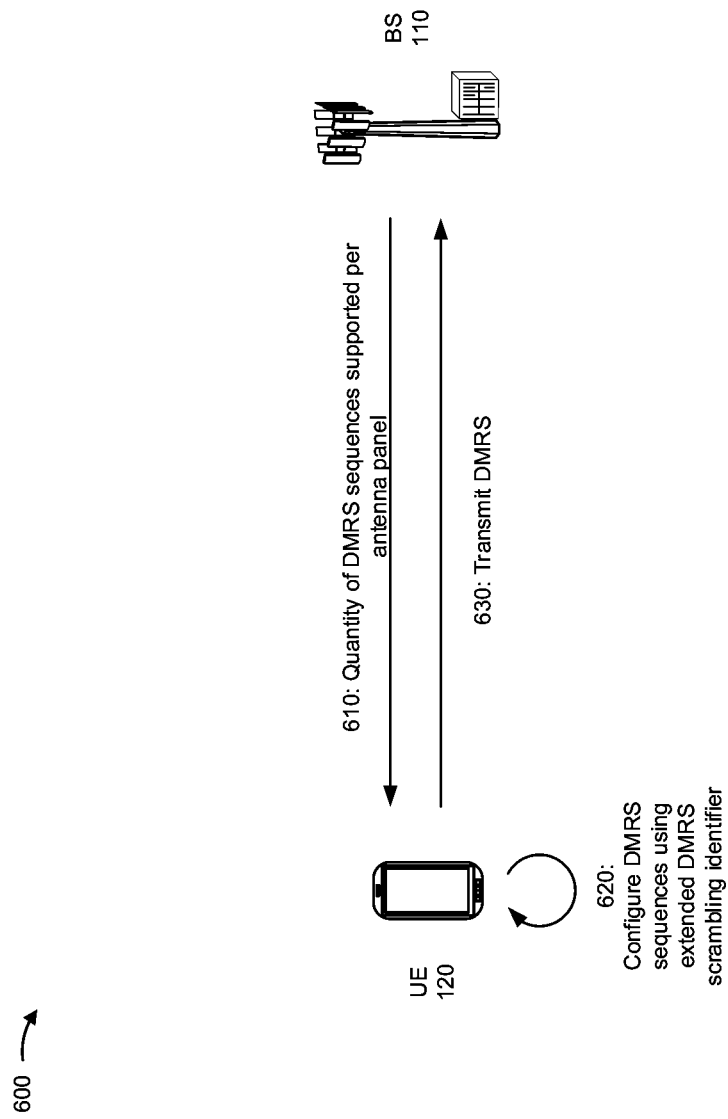
FIG. 6 is a diagram illustrating an example of using an extended DMRS scrambling identifier for DMRS communication, in accordance with various aspects of the present disclosure.

FIG. 6 is a diagram illustrating an example 600 of using an extended DMRS scrambling identifier for DMRS communication, in accordance with various aspects of the present disclosure. As shown in FIG. 6, example 600 includes a BS 110 in communication with a UE 120.

As further shown in FIG. 6, and by reference number 610, UE 120 may receive information identifying the quantity of DMRS sequences supported per antenna panel of BS 110. For example, BS 110 may transmit information identifying the quantity of DMRS sequences supported per antenna panel to a group of UEs 120 that includes the UE. In some aspects, UE 120 may receive DMRS sequence configuration information from BS 110 based at least in part on BS 110 configuring one or more DMRS sequences for a DMRS communication (e.g., by using a 'msgA-ScramblingID0' parameter or a 'msgA-ScramblingID1' parameter, or by configuring one or more additional DMRS positions, among other examples). In this case, BS 110 may configure the one or more DMRS sequences based at least in part on a quantity of DMRS sequences supported per antenna panel. In some aspects, UE 120 may receive information indicating that BS 110 supports 4 DMRS sequences per antenna panel, 8 DMRS sequences per antenna panel, and/or the like. In this case, a quantity of DMRS sequences may correspond to a quantity of DMRS scrambling identifiers (e.g., extended DMRS scrambling identifiers) supported per antenna panel. In some aspects, BS 110 may configure the extended DMRS scrambling identifiers on a per antenna port basis and provide system information or RRC signaling to UE 120 to identify the configured extended DMRS scrambling identifiers.

As further shown in FIG. 6, and by reference number 620, UE 120 may configure one or more DMRS sequences for a DMRS communication. For example, UE 120 may configure the one or more DMRS sequences based at least in part on the quantity of DMRS sequences supported per antenna panel. Additionally, or alternatively, UE 120 may configure the one or more DMRS sequences based at least in part on a PRACH preamble. For example, UE 120 may scramble the one or more DMRS sequences using an extended DMRS scrambling identifier that is based at least in part on the PRACH preamble. In this way, UE 120 may reuse a scrambling identifier of a msgA PUSCH that is to be transmitted together with the DMRS communication, as described above. In some aspects, UE 120 may map the PRACH preamble to a PRU to reuse the scrambling identifier of the msgA PUSCH for the extended DMRS scrambling identifier.

In this case, UE 120 may support one or more different possible mapping ratios. For example, UE 120 may determine the mapping ratio based at least in part on a quantity of PRACH sequences assigned for a msgA preamble on valid RACH occasions (ROs) and a quantity of PRUs assigned for msgA payload on valid PUSCH occasions (POs). In some aspects, UE 120 may determine the mapping ratio based at least in part on a received broadcast from BS 110 (e.g., of a system information) or via RRC signaling from BS 110. Additionally, or alternatively, after validation of a msgA resource occasion and msgA RO and a msgA PO for a two-step RACH, UE 120 may determine the mapping ratio based at least in part on a validation rule and a mapping order (e.g., received from BS 110). In some aspects, each msgA PUSCH configuration in an initial or active bandwidth part may be associated with a single mapping ratio, and different msgA PUSCH configurations may have different mapping ratios. The mapping ratio may be valid for at least a mapping period between msgA ROs and msgA PUSCH POs. In this case, the mapping period may be a common multiple of an SSB to RO association pattern period for each msgA PUSCH configuration.

In some aspects, UE 120 may generate the DMRS communication using a particular DMRS pattern. For example, UE 120 may generate a type-I DMRS pattern-based DMRS, a type-II DMRS pattern-based DMRS, and/or the like.

In some aspects, UE 120 may determine the extended DMRS scrambling identifier based at least in part on a type of waveform for a transmission that includes the msgA PUSCH and the DMRS communication. For example, for a CP-OFDM waveform and when transform precoding is not enabled, UE 120 may determine the extended DMRS scrambling identifier based at least in part on an equation of the form:

$$c_{init,msgA\_DMRS} \triangleq c_{init,msgA PUSCH} = RA\text{-}RNTI*2^{16} + RAPID*2^{10} + n_{ID}.$$

In this case, UE 120 reuses the bit scrambling sequence applied to the payload and CRC of the msgA, as described above. Additionally, or alternatively, UE 120 may determine the extended DMRS scrambling identifier based at least in part on an equation of the form:

$$c_{init,msgA\_DMRS}(2^{17}(N_{symb}^{slot} n_{s,f}^{\mu} + l + 1)* \langle c_{init,msgA PUSCH} \rangle_{K1} + \langle c_{init,msgA PUSCH} \rangle_{K2}) \bmod 2^{31},$$

where l is the OFDM symbol number within a slot, $n_{s,f}^{\mu}$ is the slot number within a frame, and $\langle \cdot \rangle$ is an inner quantity operator (e.g., truncating an inner quantity to K most significant bits (MSBs) or least significant bits (LSBs)). In this case, UE 120 determines the extended DMRS scrambling identifier based at least in part on the bit scrambling sequence, a symbol number for the DMRS, a slot number for the DMRS, and/or the like.

Additionally, or alternatively, when the waveform is a DFT-s-OFDM waveform and transform precoding is enabled, UE 120 may determine an extended DMRS scrambling identifier for group hopping and sequence hopping, such that:

$$u = (f_{gh} + N_{ID}^{RS}) \bmod 30$$

$$v = 0$$

$$f_{gh} = (\Sigma_{m=0}^{7} 2^m c(8(N_{symb}^{s} n_{s,f}^{\mu} + l) + m)) \bmod 30$$

In this case, UE 120 may determine $n_{ID}^{RS}$ as:

$$n_{ID}^{RS} \triangleq c_{init,msgA\_PUSCH}$$

Additionally, or alternatively, UE 120 may determine $n_{ID}^{RS}$ as:

$$n_{ID}^{RS} \triangleq \langle c_{init,msgA\_PUSCH} \rangle_{K1} \times \langle c_{init,msgA\_PUSCH} \rangle_{K2}$$

In this case, support for CP-OFDM or DFT-s-OFDM waveforms, as described above, may correspond to UE 120 determining whether to apply transform precoding for PUSCH transmission (e.g., using CP-OFDM may correspond to not using transform precoding, and using DFT-s-OFDM may correspond to using transform precoding).

As further shown in FIG. 6, and by reference number 630, UE 120 may transmit the DMRS communication. For example, based at least in part on configuring the DMRS sequences using the extended DMRS scrambling identifier, UE 120 may transmit a DMRS multiplexed with a msgA PUSCH. In this way, BS 110 and UE 120 reduce a likelihood collision between DMRSs in CBRA-based two-step RACH.

As indicated above, FIG. 6 is provided as an example. Other examples may differ from what is described with respect to FIG. 6.

Figure 7:
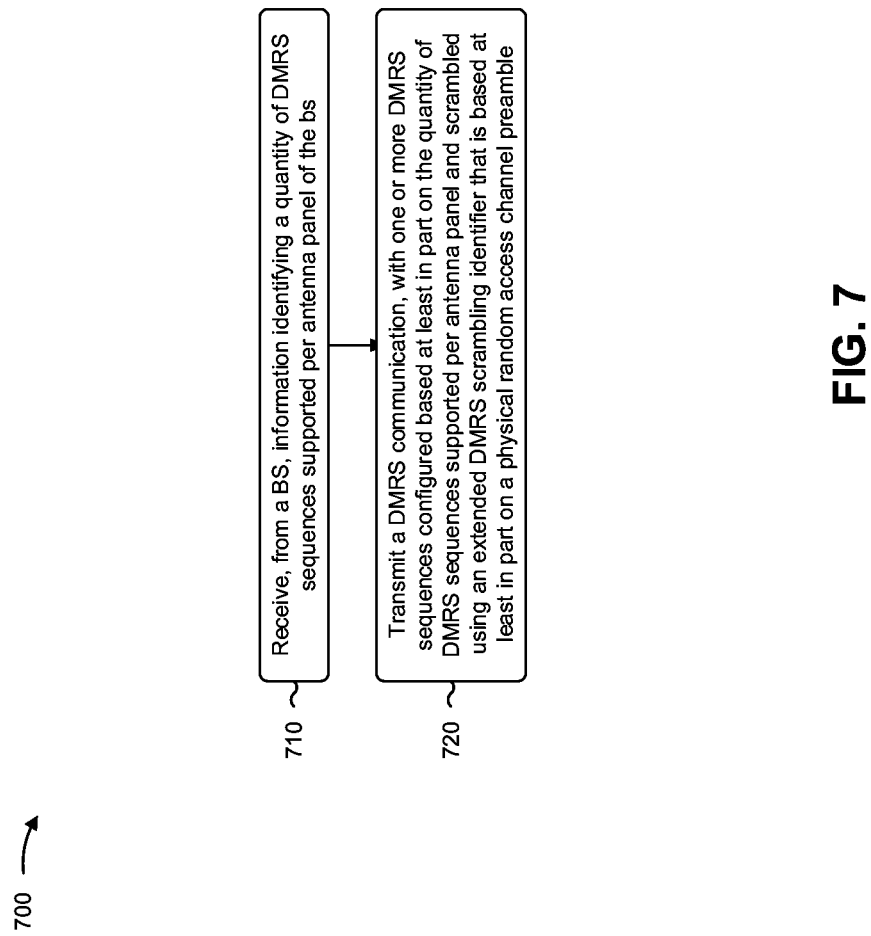
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with using an extended demodulation reference signal scrambling identifier for demodulation reference signal communication.

As shown in FIG. 7, in some aspects, process 700 may include receiving, from a BS, information identifying a quantity of DMRS sequences supported per antenna panel of the BS (block 710). For example, the UE (e.g., using antenna 252, DEMOD 254, MIMO detector 256, receive processor 258, or controller/processor 280, among other examples) may receive, from a BS, information identifying a quantity of DMRS sequences supported per antenna panel of the BS, as described above.

As further shown in FIG. 7, in some aspects, process 700 may include transmitting a DMRS communication, with one or more DMRS sequences configured based at least in part on the quantity of DMRS sequences supported per antenna panel and scrambled using an extended DMRS scrambling identifier that is based at least in part on a physical random access channel preamble (block 720). For example, the UE (e.g., using controller/processor 280, transmit processor 264, TX MIMO processor 266, MOD 254, or antenna 252, among other examples) may transmit a DMRS communication, with one or more DMRS sequences configured based at least in part on the quantity of DMRS sequences supported per antenna panel and scrambled using an extended DMRS scrambling identifier that is based at least in part on a physical random access channel preamble, as described above.

Process 700 may include additional aspects, such as any single aspect or any combination of aspects described below and/or in connection with one or more other processes described elsewhere herein.

In a first aspect, process 700 includes configuring the one or more DMRS sequences, which includes generating a waveform for the DMRS communication, where the waveform for the DMRS communication is a cyclic-prefix orthogonal frequency division multiplexing (CP-OFDM) waveform or a discrete Fourier transform spread orthogonal frequency division multiplexing (DFT-s-OFDM) waveform.

In a second aspect, alone or in combination with the first aspect, the quantity of DMRS sequences supported per antenna panel is 4 or 8.

In a third aspect, alone or in combination with one or more of the first and second aspects, a DMRS pattern of the one or more DMRS sequences is a Type-I DMRS pattern or a Type-II DMRS pattern.

In a fourth aspect, alone or in combination with one or more of the first through third aspects, configuring the one or more DMRS sequences includes mapping the physical random access channel preamble to a physical uplink shared channel resource unit including the one or more DMRS sequences in connection with a mapping ratio within a mapping period between preamble and PUSCH resource unit.

In a fifth aspect, alone or in combination with one or more of the first through fourth aspects, the DMRS communication is associated with a physical uplink shared channel with transform precoding.

In a sixth aspect, alone or in combination with one or more of the first through fifth aspects, the DMRS communication is associated with a physical uplink shared channel without transform precoding.

In a seventh aspect, alone or in combination with one or more of the first through sixth aspects, the extended DMRS scrambling identifier is based at least in part on a physical uplink shared channel scrambling identifier of a physical random access channel message associated with the physical random access channel preamble.

In an eighth aspect, alone or in combination with one or more of the first through seventh aspects, the extended DMRS scrambling identifier is configured on a per antenna port basis via a system information or radio resource control transmission.

In a ninth aspect, alone or in combination with one or more of the first through eighth aspects, process 700 may include determining the mapping ratio based at least in part on at least one of a received system information transmission from the BS, a received radio resource control transmission from the BS, a set of validation rules, or a mapping order.

In a tenth aspect, alone or in combination with one or more of the first through ninth aspects, the mapping ratio is defined for a PUSCH configuration, such that each PUSCH configuration, of a plurality of PUSCH configurations, in an initial or active bandwidth part is associated with a single mapping ratio.

In an eleventh aspect, alone or in combination with one or more of the first through tenth aspects, a first PUSCH configuration of the plurality of PUSCH configurations is associated with a different mapping ratio than a second PUSCH configuration of the plurality of PUSCH configurations.

In a twelfth aspect, alone or in combination with one or more of the first through eleventh aspects, the mapping period is based at least in part on a synchronization signal block to resource occasion association pattern period.

In a thirteenth aspect, alone or in combination with one or more of the first through twelfth aspects, process 700 may include configuring the one or more DMRS sequences for the DMRS communication based at least in part on the quantity of DMRS sequences supported per antenna panel and the physical random access channel preamble; and transmitting the DMRS communication may include transmitting the DMRS communication based at least in part on configuring the one or more DMRS sequences for the DMRS communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, by the UE and from a network entity, information identifying a quantity of demodulation reference signal (DMRS) sequences supported per antenna panel of the network entity; and
transmitting a DMRS communication, with one or more DMRS sequences configured based at least in part on the quantity of DMRS sequences supported per antenna panel of the network entity and scrambled using an extended DMRS scrambling identifier that is determined based at least in part on radio resource mapping a physical random access channel preamble to a physical uplink shared channel (PUSCH) resource unit including the one or more DMRS sequences.

2. The method of claim 1, further comprising:
configuring the one or more DMRS sequences for the DMRS communication based at least in part on the quantity of DMRS sequences supported per antenna panel and the physical random access channel preamble; and
wherein transmitting the DMRS communication comprises:
transmitting the DMRS communication based at least in part on configuring the one or more DMRS sequences for the DMRS communication.

3. The method of claim 2, wherein configuring the one or more DMRS sequences comprises:
generating a waveform for the DMRS communication, wherein the waveform for the DMRS communication is a cyclic-prefix orthogonal frequency division multiplexing (CP-OFDM) waveform or a discrete Fourier transform spread orthogonal frequency division multiplexing (DFT-s-OFDM) waveform.

4. The method of claim 1, wherein the quantity of DMRS sequences supported per antenna panel is 4 or 8.

5. The method of claim 1, wherein a DMRS pattern of the one or more DMRS sequences is a Type-I DMRS pattern or a Type-II DMRS pattern.

6. The method of claim 1, wherein the extended DMRS scrambling identifier is configured on a per antenna port basis via a system information or radio resource control transmission.

7. The method of claim 1, wherein the radio resource mapping comprises:
mapping the physical random access channel preamble to the PUSCH resource unit including the one or more DMRS sequences in connection with a mapping ratio within a mapping period between preamble and PUSCH resource unit.

8. The method of claim 7, further comprising:
determining the mapping ratio based at least in part on at least one of:
a received system information transmission from the network entity,
a received radio resource control transmission from the network entity,
a set of validation rules, or
a mapping order.

9. The method of claim 7, wherein the mapping ratio is defined for a PUSCH configuration, such that each PUSCH configuration, of a plurality of PUSCH configurations, in an initial or active bandwidth part is associated with a single mapping ratio.

10. The method of claim 9, wherein a first PUSCH configuration of the plurality of PUSCH configurations is associated with a different mapping ratio than a second PUSCH configuration of the plurality of PUSCH configurations.

11. The method of claim 7, wherein the mapping period is based at least in part on a synchronization signal block to random access channel occasion association pattern period.

12. The method of claim 1, wherein the DMRS communication is associated with a physical uplink shared channel with transform precoding.

13. The method of claim 1, wherein the DMRS communication is associated with a physical uplink shared channel without transform precoding.

14. The method of claim 1, wherein the extended DMRS scrambling identifier is based at least in part on a PUSCH scrambling identifier of a physical random access channel message associated with the physical random access channel preamble.

15. A user equipment (UE) for wireless communication, comprising:
a memory; and
one or more processors coupled with the memory, the one or more processors configured to:
receive, by the UE and from a network entity, information identifying a quantity of demodulation reference signal (DMRS) sequences supported per antenna panel of the network entity; and
transmit a DMRS communication having one or more DMRS sequences configured based at least in part on the quantity of DMRS sequences supported per antenna panel of the network entity and scrambled using an extended DMRS scrambling identifier that is determined based at least in part on radio resource mapping a physical random access channel preamble to physical uplink shared channel (PUSCH) resource unit including the one or more DMRS sequences.

16. The UE of claim 15, wherein the one or more processors are further configured to:
configure the one or more DMRS sequences for the DMRS communication based at least in part on the quantity of DMRS sequences supported per antenna panel and the physical random access channel preamble; and
wherein the one or more processors, when transmitting the DMRS communication, are configured to:
transmit the DMRS communication based at least in part on configuring the one or more DMRS sequences for the DMRS communication.

17. The UE of claim 16, wherein the one or more processors, when configuring the one or more DMRS sequences, are configured to:
generate a waveform for the DMRS communication, wherein the waveform for the DMRS communication is a cyclic-prefix orthogonal frequency division multiplexing (CP-OFDM) waveform or a discrete Fourier transform spread orthogonal frequency division multiplexing (DFT-s-OFDM) waveform.

18. The UE of claim 15, wherein the quantity of DMRS sequences supported per antenna panel is 4 or 8.

19. The UE of claim 15, wherein a DMRS pattern of the one or more DMRS sequences is a Type-I DMRS pattern or a Type-II DMRS pattern.

20. The UE of claim 15, wherein the extended DMRS scrambling identifier is configured on a per antenna port basis via a system information or radio resource control transmission.

21. The UE of claim 15, wherein the one or more processors are further configured to:
determine the extended DMRS scrambling identifier by mapping the physical random access channel preamble to the PUSCH resource unit including the one or more DMRS sequences in connection with a mapping ratio within a mapping period between preamble and PUSCH resource unit.

22. The UE of claim 21, wherein the one or more processors are further configured to:
determine the mapping ratio based at least in part on at least one of:
a received system information transmission from the network entity,
a received radio resource control transmission from the network entity,
a set of validation rules, or
a mapping order.

23. The UE of claim 21, wherein the mapping ratio is defined for a PUSCH configuration, such that each PUSCH configuration, of a plurality of PUSCH configurations, in an initial or active bandwidth part is associated with a single mapping ratio.

24. The UE of claim 23, wherein a first PUSCH configuration of the plurality of PUSCH configurations is associated with a different mapping ratio than a second PUSCH configuration of the plurality of PUSCH configurations.

25. The UE of claim 21, wherein the mapping period is based at least in part on a synchronization signal block to random access channel occasion association pattern period.

26. The UE of claim 15, wherein the DMRS communication is associated with a physical uplink shared channel with transform precoding.

27. The UE of claim 15, wherein the DMRS communication is associated with a physical uplink shared channel without transform precoding.

28. The UE of claim 15, wherein the extended DMRS scrambling identifier is based at least in part on a PUSCH scrambling identifier of a physical random access channel message associated with the physical random access channel preamble.

29. A non-transitory computer-readable medium storing one or more instructions for wireless communication, the one or more instructions comprising:
one or more instructions that, when executed by one or more processors of a user equipment (UE), cause the one or more processors to:
receive, by the UE, information identifying a quantity of demodulation reference signal (DMRS) sequences supported per antenna panel of a network entity; and
transmit a DMRS communication having one or more DMRS sequences configured based at least in part on the quantity of DMRS sequences supported per antenna panel of the network entity and scrambled using an extended DMRS scrambling identifier that is determined based at least in part on radio resource mapping a physical random access channel preamble to physical uplink shared channel (PUSCH) resource unit including the one or more DMRS sequences.

30. An apparatus for wireless communication, comprising:
means for receiving, from a network entity, information identifying a quantity of demodulation reference signal (DMRS) sequences supported per antenna panel of the network entity; and
means for transmitting a DMRS communication having one or more DMRS sequences configured based at least in part on the quantity of DMRS sequences supported per antenna panel and scrambled using an extended DMRS scrambling identifier that is determined based at least in part on radio resource mapping a physical random access channel preamble to physical uplink shared channel (PUSCH) resource unit including the one or more DMRS sequences.

* * * * *